US 8,875,268 B2

(12) United States Patent
Swerdlow et al.

(10) Patent No.: US 8,875,268 B2
(45) Date of Patent: Oct. 28, 2014

(54) BROWSER SESSION PRIVACY LOCK (75) Inventors: Andrew Swerdlow, San Francisco, CA (US); Luke Hiro Swartz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 4 days.

(21) Appl. No.: 13/570,513

(22) Filed: Aug. 9, 2012

(65) Prior Publication Data
US 2014/0047523 A1 Feb. 13, 2014

(51) Int. Cl.
G06F 7/04 (2006.01)
G06F 15/16 (2006.01)
G06F 17/30 (2006.01)
H04L 29/06 (2006.01)

(52) U.S. Cl.
USPC .............................. 726/7; 713/193

(58) Field of Classification Search
USPC .................................. 726/7
See application file for complete search history.

(56) References Cited

U.S. PATENT DOCUMENTS

| 6,799,248 | B2 * | 9/2004 | Scherr ........................... 711/118 |
| 7,043,752 | B2 * | 5/2006 | Royer et al. ...................... 726/8 |
| 2004/0001101 | A1 | 1/2004 | Trajkovic et al. |
| 2004/0073666 | A1 * | 4/2004 | Foster et al. ................... 709/225 |
| 2004/0093582 | A1 | 5/2004 | Segura |
| 2005/0120024 | A1 * | 6/2005 | Tharpe et al. ................... 707/10 |
| 2005/0235155 | A1 * | 10/2005 | Lopatin et al. ................ 713/182 |
| 2006/0248452 | A1 * | 11/2006 | Lambert et al. ............... 715/513 |
| 2007/0016958 | A1 | 1/2007 | Bodepudi et al. |
| 2008/0222299 | A1 * | 9/2008 | Boodaei ........................ 709/229 |
| 2009/0150824 | A1 | 6/2009 | Furuichi |
| 2010/0064375 | A1 | 3/2010 | Gorczowski et al. |
| 2011/0055912 | A1 * | 3/2011 | Fusari et al. ...................... 726/8 |
| 2011/0296504 | A1 * | 12/2011 | Burch et al. ...................... 726/6 |
| 2012/0079609 | A1 | 3/2012 | Bender et al. |
| 2012/0240210 | A1 * | 9/2012 | Seidl et al. ........................ 726/8 |
| 2012/0260192 | A1 * | 10/2012 | Detweiler ..................... 715/745 |
| 2012/0284767 | A1 * | 11/2012 | Hockings et al. ................. 726/1 |

FOREIGN PATENT DOCUMENTS

EP 2264641 12/2010

OTHER PUBLICATIONS

Harold W. Cain; An Architectural Evaluation of Java TPC-W; Year: 2001; IEEE; pp. 1-12.*
"HTTP cookie", Wikipedia, the free encyclopedia, Jul. 27, 2012, <http://en.wikipedia.org/w/index.php?title=HTTP_cookie&oldid=504459350>, 14 pages.

* cited by examiner

Primary Examiner — Mohammad W Reza
Assistant Examiner — Monjour Rahim
(74) Attorney, Agent, or Firm — McDermott Will & Emery LLP (57) ABSTRACT Techniques are shown for executing a web browser on a client computing device and requesting access to applications available from a hosting server over a network in communication with the client device. The web browser stores authorization credentials for accessing designated applications available from the hosting server in a lockbox. A message received at the web browser provides instructions to lock all designated applications by rendering at least partially blanked-out or partially obscured visual displays for the designated applications, with no viewing of, access to, or operation on selected data within the designated applications permitted, while the locked designated applications remain logged-in. This Abstract is submitted with the understanding that it will not be used to interpret or limit the scope or meaning of the claims.

22 Claims, 4 Drawing Sheets

BROWSER SESSION PRIVACY LOCK

BACKGROUND

A user experience on the Internet may include opening or accessing multiple Web-based applications and operating on data within one or more of the applications. Access to many web-based applications may be restricted through the use of authorization keys or other required permissions or user credentials.

SUMMARY

Techniques are disclosed for securing data associated with designated applications opened in a web browser on a client system. A client system executes a web browser and the web browser receives an access request from a user to access one or more applications available from a hosting server over a network in communication with the client system. The client system communicates with the hosting server, providing authorization credentials for accessing one or more designated applications of the one or more applications available from the hosting server. The client system stores the authorization credentials at least in part on one of the web browser or the client system. The web browser receives a message indicating instructions to lock all designated applications by rendering one or more at least partially blanked-out or partially obscured visual displays for the designated applications, with no viewing of, access to, or operation on selected data within the designated applications permitted, while the locked designated applications remain logged-in.

Implementations may include corresponding systems, apparatus, and computer programs, configured to perform the actions of the methods, encoded on computer storage devices. This Summary is not intended to introduce key features or essential features of the claimed subject matter, but merely provides a selection of concepts that are further described in the Detailed Description. Further implementations, features, and advantages, as well as the structure and operation of the various implementations are described in detail below with reference to accompanying drawings.

BRIEF DESCRIPTION OF THE FIGURES

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

A need exists to allow a user to quickly lock selected applications accessed on a web browser, for example, when the user wants to lend out their computer to another user without giving the other user access to some or all of the data in designated applications opened within a browser on the computer. Users may also forget to log out of open applications on a public computer, or on their own computer before allowing someone else to use the computer, or before relinquishing their control over that particular client device. The inconvenience of logging out of and back into many web applications that may include personal, private, or sensitive data, may contribute to a tendency for users to remain logged into applications opened within a web browser, even after they leave the machine, thus creating potential security issues.

Network users are often required to properly log in to access applications, data, or services from another system via the network. Often, using a network-based login, a particular user can log in via multiple different systems or client computing devices connected to a network, to access a same set of applications, data, or services from a host server system. Each host server system providing the applications, data, or services may implement different levels of security in association with a login. Once the login data entered by a user is verified, the system providing access to the applications, data, and services enables a session in which the client system at which the user logs in is enabled to access the data and services. The process of logging in to a particular web-based application accessed over a network such as the Internet can be time-consuming, and involved, especially when detailed passwords must be recalled, or multiple steps for authentication must be performed.

To enable a session on a web-based application, some servers pass a session token or other piece of identifying data, also termed a cookie, to the requesting client system to identify the session and set parameters for the session. Where a host server system provides a client system access to commercial transactions and data, the session token may specify that if no activity within a browser window opened to the commercial transaction is detected within a particular time period, then the session is to terminate.

With the number of logins that a user may perform in a particular day and the number of different client systems from which a user may login, a user may lose track of whether all opened sessions have been logged out of when the user leaves a particular client computing system. While some servers passing a session token may include a time limit for inactivity after which a session automatically terminates, a user may still be concerned about whether another person could still be accessing the user login for secure access prior to termination. Further, even if a user logs out of a session at a particular client system, the user may not have closed all windows with data associated with the session, leaving that data accessible to a next person using the client session.

Therefore, in response to the foregoing, one or more implementations of the new technology include enabling a user to secure all data associated with designated applications or particular login-based sessions, with a single action, whether the login-based sessions are all opened from one client system or multiple client systems. In alternative implementations, it would also be advantageous to enable a user to secure the display of open windows at one client system from another client system. A user on a public computer or other borrowed computing device may have entered potentially sensitive login information or other data they do not want anyone else to see when accessing a particular web-based application. The user may even realize that they have done this on several computing devices now out of their control.

An automatic time-out mechanism provided by the specific web-based applications that the user was accessing may provide one way of ensuring that any private data or other login information for the application would automatically become inaccessible to others after a certain period of time. An application developer would generally provide the time-out or lock-out mechanisms effective only at the application level. Techniques are disclosed herein to enable a user to place a browser application loaded on a client device easily and quickly into a selectively locked configuration. In the selectively locked configuration, all web-based applications open in the browser and designated by the user become inaccessible for viewing or processing. The locked applications remain logged in, but display a largely blank screen to any unauthorized users, with only a message that access to the application can only be obtained through the entry of a password or other credential.

Other non-designated applications or browsers on the device remain fully accessible. A user can set up a Web browser, or even just one or more individual applications provided with the functionality disclosed herein to safely lock away all authorization keys or credentials needed to access designated applications. In various implementations a user could set up one or more individual applications contained within a tab on the web browser to become inaccessible until a password or other credential is entered. The disclosed system and techniques lock all authorization keys for designated applications in a temporary lock box on the browser. A user can unlock all of the authorization keys and designated applications by entering a single authorization key, password, or other credential. Applications that are locked in this manner remain logged in, but the browser will not display any data associated with the locked applications, nor allow access to those applications until the user enters the password needed to open the lockbox.

In various implementations of this disclosure, user-controlled mechanisms could be available within a web browser running on a client device. These user-controlled mechanisms could enable the user to selectively register specific designated applications that the user has logged into on one or more client devices. Registration of specific applications running on the web browser could provide a browser-level mechanism for locking out designated applications upon the occurrence of automatic or user-initiated actions. In alternative implementations, a user may also be able to access a web browser on a particular remote client computing device from another client computing device if steps were taken to enable such remote access to the client computing device.

Various implementations of this disclosure provide a system and techniques for managing the state and/or user information associated with web-accessible applications designated by a user as applications the user desires to secure from any unauthorized access to data in the applications. In general, the applications can be web-based applications accessed over a network such as the Internet using stateless protocols, such as, for example, a Hypertext Transfer Protocol (HTTP). A stateless protocol is a communications protocol that treats each request as an independent transaction that is unrelated to any previous request so that the communication consists of independent pairs of requests and responses. A stateless protocol does not require the server to retain session information or status about each communications partner during the requests, such as when one or more web-based applications are instantiated on a web browser.

The host server on which a client computing device accesses a web-based application using HTTP, or other similar stateless protocols, may not retain any user or session information. The web browser on the client computing device can be provided with an application registration utility operatively configured to receive identification of the designated applications opened in the web browser, and for which a user desires to secure data within the designated applications from being accessed or processed by unauthorized users. In various implementations of this disclosure, a simple process and mechanism can be provided for allowing a user to designate particular applications that are opened within the browser as applications that should be locked upon the user leaving the client computing device. Examples of mechanisms for designating particular applications could include a selection from a toolbar provided on the browser, selection of an option in a drop-down menu available within the browser, a particular combination of key strokes on the keyboard of the client device, an automatic time-out procedure, wherein the time is set by the user, or pre-selected, etc.

The user information associated with each designated application opened within the web browser on the client computing device can include user credentials such as user names, passwords, authorization keys, and/or authentication parameters entered by a user to gain full access to the application. Data entered into and displayed within the designated application may include sensitive, personal, or confidential information, not intended for public viewing or operations. Sensitive user data may also include a record of views accessible to the user, a record of views recently displayed to the user, a record of folders recently accessed by the user, a record of URLs (Uniform Resource Locators) for folders commonly accessed by the user from within the application, etc. The state information associated with each of the designated applications can include a record of other entities or sources of information linked from within the applications upon receiving requests from the user via the stateless protocol. The user and/or state information associated with each designated application opened within the web browser can be stored in any suitable data structure, and/or data storage method. Such data structures can include, but are not limited to, lists, linked lists, arrays, objects, records, database records, fields, files and trees.

A user may access web-based applications located on a host server by employing a web browser loaded on the client computing device (e.g. Internet Explorer, Safari, Firefox, Google Chrome, etc.). The web browser and the host server may communicate over a wireless or wired network via a stateless protocol (e.g., hypertext transfer protocol (HTTP)). For example, stateless protocol HTTP requests and/or responses may travel between the web browser, a browser plugin, or a browser extension on the client computing device and the host server.

One or more resources may be associated with each designated application. The resources can include data, files, memory, network bandwidth, processor time, and communication devices. An application program manager can manage the resources allocated to each designated application and perform the functions necessary to lock the screen displays associated with each designated application. An authorization parameter identifier can identify the user credentials associated with each of the designated applications. An authorization parameter lock box can be formed as at least a portion of cache memory contained on the client device, and communicatively coupled with the authorization parameter identifier to store the user credentials for each of the designated applications.

The application program manager enables efficient management of the resources used by each designated application by tracking user and/or state specific information associated with the user of the web browser accessing the designated application. By facilitating tracking whether a user is running more than one session and/or more than one designated application, and for how long, and tracking what resources, if any, are allocated to that user, the application program manager can improve the efficiency of resource allocation for each designated application. In situations where a user may have accessed one or more applications from within a browser on a client computing device, and then either left the device available to the public, lent the device to someone, or otherwise conceded control of the client computing device without logging out of the applications, the application program manager can take steps to secure the designated applications and prevent the designated applications from tying up valuable computing resources.

In various alternative embodiments, the application program manager can perform functions that may include monitoring the use of resources by designated applications running in a web browser as an additional technique for determining when to lock the screen displays for those designated applications, or all of one or more applications contained within a particular tab on a web browser, or all applications running within a particular web browser. The application program manager may also include additional functionality that monitors the physical location of a user relative to a client computing device to determine when to lock the screen displays for any applications running in a web browser on that client computing device.

The user and/or state information evaluated by the application program manager can be employed for tasks including, but not limited to, tracking associations between applications and computing sessions, tracking associations between applications, tracking progress through a thread and/or process, tracking actions taken by users and/or browser sessions, and locating resources associated with sessions, applications, threads and/or processes, for example. The application program manager can make determinations on whether to activate a screen locking action based on one or more of the results from these evaluations of user and/or state information. For example, the application program manager may delay a pre-determined screen locking action based on time as a result of a determination that a thread or process has not been completed.

A user accessing a designated application on a web browser running on a client computing device may create a browser session, perform some action, and then not perform other actions from that session. For example, the user may start a browser session, access an email application, read a message and then start some other activity (e.g. word processing), leaving the browser session active and connected to the email application. The application program manager may be operative to track state, and/or user, specific information associated with the user. With a finite set of resources available to allocate to the operations being performed by the user, monitoring the usage for that user can improve security for data within a designated application, as well as improving the performance of the designated application and the entire computing system. For example, if the application program manager determines that a particular designated application has not been accessed for a first pre-determined period of time (e.g. one hour), then the application program manager can activate a security protocol wherein the authorization parameters identified for the designated application are sandboxed into an authorization parameter lockbox, and at least portions of the display screen associated with the application are obscured or blanked out. If the application program manager then determines that a user has not accessed the designated application for a second pre-determined period of time after the first pre-determined period of time has expired (e.g. two hours), the application program manager can reclaim resources allocated to the designated application. The resources can include, but are not limited to, memory, processor cycles, data communication devices and data communications bandwidth. Thus, for example, the memory allocated to the particular designated application associated with the browser session, and abandoned when the user started another task, or otherwise relinquished control of the client computing device, can be reclaimed. Such reclamation can improve the efficiency of the entire computing system.

EXAMPLE IMPLEMENTATION

Figure 1:
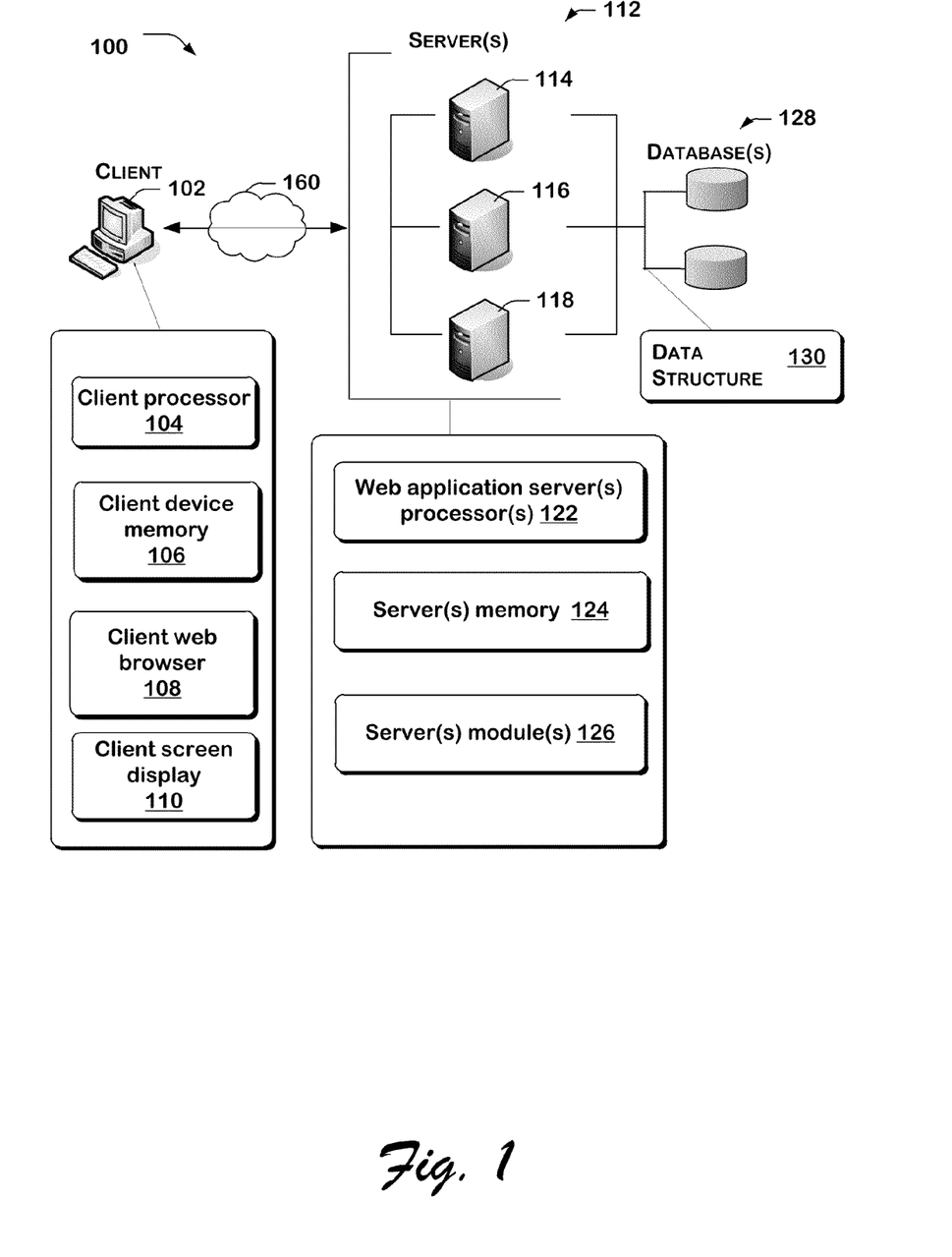
FIG. 1 is a schematic diagram of a system in accordance with one or more implementations of the disclosure.

FIG. 1 illustrates a web-based environment in which various implementations of this disclosure may be practiced. The user of a web browser 108 at a client computing device 102 of client 100 communicates over a network 160 to access one or more applications at web application servers 114, 116, and 118.

The client web browser 108 renders a hypertext markup language (HTML) document produced by an application accessed on a web application server on a client device screen display 110 of client computing device 102.

Figure 2:
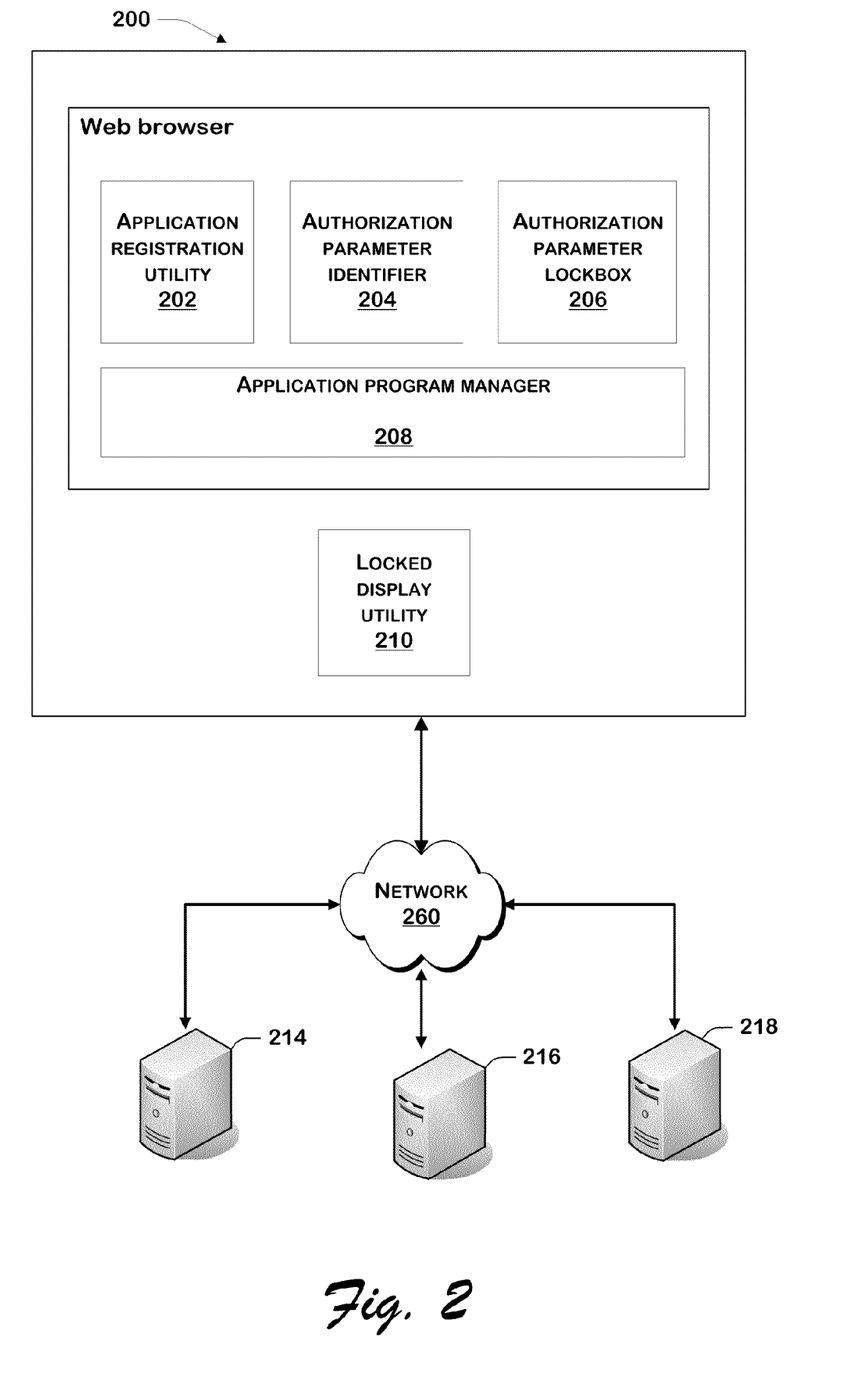
FIG. 2 is a schematic diagram illustrating features in accordance with an implementation of the disclosure.

As shown in FIG. 2, a client computing device 200 is connected over a network 260, such as the Internet, to web application host servers 214, 216, and 218. The client computing device 200 includes a web browser application. The web browser includes an application registration utility 202, an authorization parameter identifier 204, an authorization parameter lockbox 206, an application program manager 208, and a locked display utility 210. Although FIG. 2 illustrates these various components as part of the web browser on a client computing device, at least a portion of these components could be contained on one or more servers communicatively coupled to the client device, or in some instances at least a portion of these components may be contained on one or more client devices that could be communicatively coupled in a peer-to-peer (P2P) configuration.

When a user attempts to access one or more web-based applications located on host servers 214, 216, and/or 218, the user may have to enter various credentials to gain access to each application. The credentials may include authentication parameters such as username and password to verify that the user is who they say they are, and/or authentication parameters that specify the extent of authorization that particular user has when operating the application. The authorization parameter identifier 204 can monitor these entries by a user and identify which entries or other data provided by the user constitute the authentication parameters for each application opened within the web browser. The authorization parameter identifier 204 can then store the authorization parameters in the authorization parameter lockbox 206.

A user may instantiate the functionality of the application registration utility for only certain applications that the user has opened within the web browser, for all applications within a particular tab on the web browser, or for all applications running within a particular web browser. A simple process is provided so that a user will not be deterred from registering or designating applications that may include sensitive, private, or confidential information. In various implementations, the web browser can present a toolbar to the user with an available selection for designating a particular application as one that the user would like to include in the processes described herein. Alternative implementations can include the web browser providing a toolbar or a drop-down menu for selecting an application to be a designated application, for selecting all applications running within a particular tab on the web browser, or for selecting all applications running within the web browser. Further alternative implementations can include the client computing device providing certain keystroke combinations or shortcuts for designating an application, etc. Once a user has selected an application or applications using one of the described techniques, the application registration utility designates that application or applications as subject to the various security protocols and resource utilization procedures discussed above.

The application program manager 208 monitors the state and/or user information associated with each application designated by the application registration utility. The authorization parameter identifier tracks the authentication parameters entered by the user to log into each designated application, and stores those parameters in the lockbox.

The application program manager 208 activates the locked display utility in accordance with procedures that can be one or more of user-initiated, fully automatic, or some combination of both. In some implementations, a user can initiate activation of the locked display utility through the application program manager by selecting an icon on a page displayed by the web browser, selecting from a toolbar, selecting from a drop-down menu, entering certain keystrokes or combinations of keystrokes, etc., to cause the locked display utility to obscure or blank-out at least certain portions of the display screen associated with designated applications.

In alternative implementations, the application program manager could institute lock-down procedures for one or more designated applications fully automatically, using inputs based on parameters that may include, but are not limited to, time elapsed since the last input by a user for a particular designated application, the physical location of a user relative to the client computing device, etc. Time inputs could be pre-selected by a user, or pre-determined, such as by the web browser, the specific application, or the application program manager.

The locked display utility 210 can perform the function of ensuring that designated applications comply with the desired security protocols of a user by obscuring at least portions of the screen display for the applications, and by preventing operations on any data, or performance of other functions within a designated application. The locked display utility can perform these functions for any designated application that has been locked by one or more of user-initiated actions, application program manager initiated actions, or some combination of both. The designated applications that have been locked can remain logged in so that a user will not have to go through the sometimes lengthy procedures associated with logging out and logging back into a restricted web-based application.

In addition to protecting the data within a designated application, the locked display utility can also present a message on the screen of a locked application providing instructions for how to unlock the screen, for example by entering a password. At the web browser level, this function could serve to unlock all, or only certain of the designated applications that have been locked within the browser. In alternative implementations where the locking functionality is only provided for specific applications, the application developer may provide the protocols or instructions that the application program manager could then use to lock that particular application.

EXAMPLE TECHNIQUES

Figure 3:
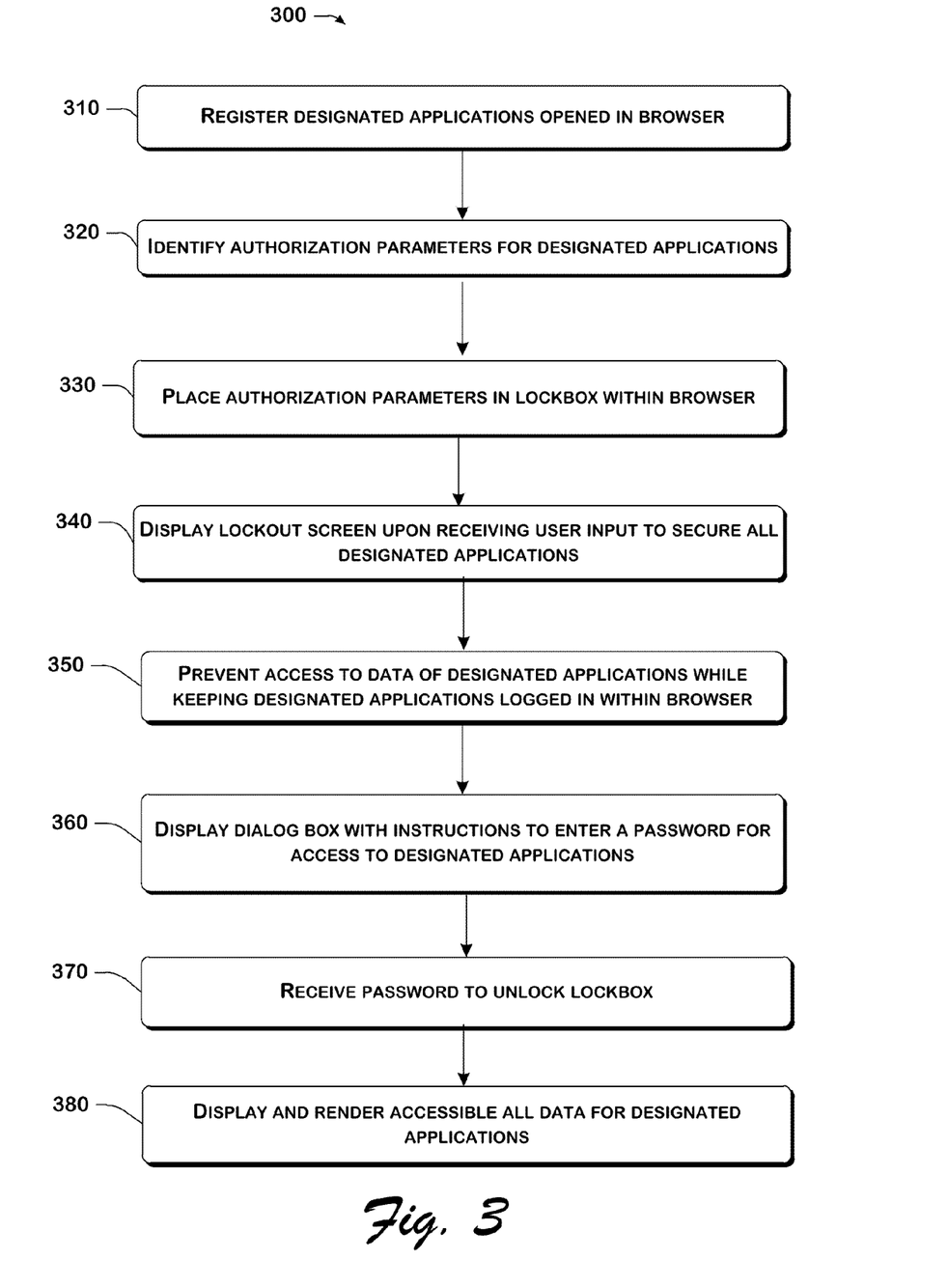
FIG. 3 is a flow chart illustrating techniques employed in accordance with one or more implementations of the disclosure.

FIG. 3 illustrates the techniques 300 employed in one or more implementations of this disclosure. At 310, an application registration utility designates certain applications opened within a browser on a client computing device as applications that a user would like subjected to certain security protocols. These security protocols can include preventing access by unauthorized users to data, user information, past actions, etc. within the designated applications. By providing these lockout procedures at the browser level, the techniques disclosed herein enable a simple, quick, and effective way for a user to secure all data and operations associated with as many applications opened within a browser as desired. The techniques also enable implementation of these security and privacy protocols without requiring a user to log out of the applications and then log back in.

At 320, an authorization parameter identifier identifies the authorization parameters, such as user credentials, for the designated applications.

At 330, the authorization parameter identifier places the identified authorization parameters into the lockbox.

At 340, the locked display utility displays a locked display screen upon receiving instructions from a user through the application program manager. In alternative implementations, the locked display utility may receive automated instructions from the application program manager, such as instructions based upon time parameters, a combination of automated instructions and user-initiated instructions, such as selections made by the user from a toolbar, drop-down menu, keyboard, etc., or user-initiated instructions alone.

At 350, the application program manager provides instructions to the locked display utility to prevent access to data, state and/or user information, etc. within a designated application, while at the same time leaving the designated applications in their logged-in state.

At 360, the locked display utility displays a message on the web browser for all designated applications, instructing a user to enter a password or other credential to gain access to all of the authorization parameters locked in the lockbox at 330.

At 370, the locked display utility receives the required password or other user credential to unlock the lockbox and provide access to the authorization parameters for all of the designated applications.

At 380, the web browser, through application program manager 208 and locked display utility 210, once again allows the display of all data and operations on data within designated application, without requiring a user to log back into the designated applications.

EXAMPLE COMPUTER SYSTEM

Implementations of the present disclosure can be carried out on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform. Therefore, one or more of the above-described utilities, modules, or other functionalities may be embodied on a third-party server, one or more servers of the system 400, or some combination thereof.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 4:
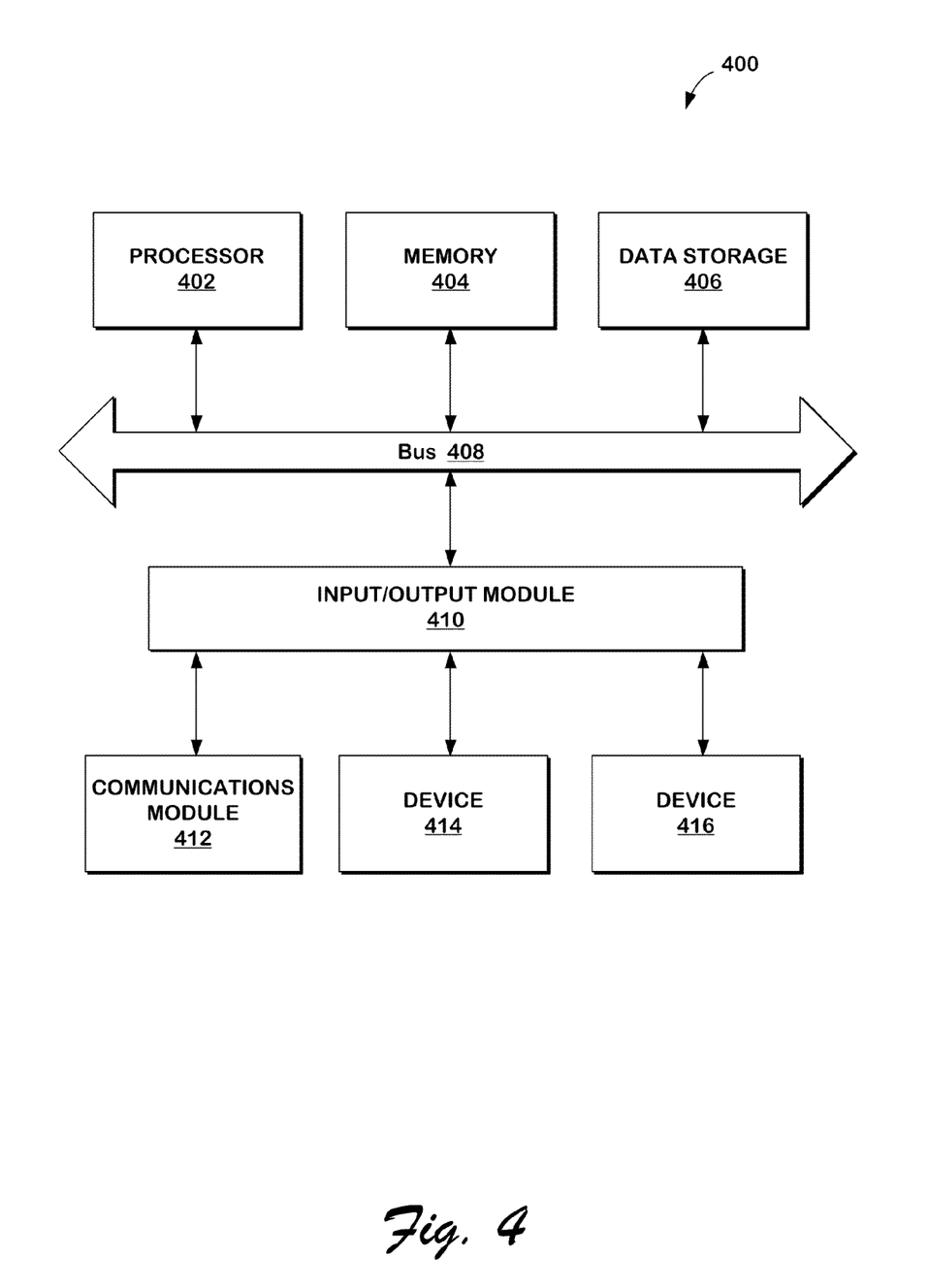
FIG. 4 is a schematic diagram of a computer system employed in accordance with one or more implementations of the disclosure.

FIG. 4 is a block diagram illustrating an exemplary computer system 400 with which the system of FIGS. 1 and 2 can be implemented. In certain aspects, the computer system 400 may be implemented using hardware or a combination of software and hardware, either in a dedicated server, or integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402. These processors may be part of any of the various components shown in FIGS. 1, and 2.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

A software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of the program across the network. The networking of some or all of these devices may facilitate parallel processing of a program or method at one or more location without deviating from the scope of the disclosed subject matter. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Examples of machines on which the elements described herein may be implemented may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. The databases/data structures 128, 130, shown in FIG. 1, are all examples of data storage devices used in various implementations of this disclosure. Computer system 400 may be coupled via input/output module 410 to various devices. The input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, the input/output module 410 is configured to connect to a plurality of devices, such as an input device 414 and/or an output device 416. Exemplary input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 416 include display devices, such as a CRT (cathode ray tube) or LCD (liquid crystal display) monitor, for displaying information to the user.

According to one aspect of the present disclosure, the browser session privacy lock system, as shown in FIG. 1, can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single embodiment or implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method of securing data associated with designated applications opened in a web browser on a client system, the method comprising:

executing a web browser on the client system;

receiving via the web browser running on the client system an access request from a user to access one or more applications available from a hosting server over a network in communication with the client system;

communicating from the client system to the hosting server the request for access to the one or more applications;

receiving via the web browser, authorization credentials associated with the user for accessing one or more designated applications of the one or more applications available from the hosting server;

storing the authorization credentials at least in part on one of the web browser or the client system;

receiving a message via the web browser indicating instructions to lock the designated applications; and locking, in response to the message, the designated applications by rendering, via the web browser, one or more at least partially blanked-out or partially obscured visual displays via the web browser for the designated applications with no viewing of, access to, or operation on selected data within the designated applications permitted, while the locked designated applications remain logged-in; and displaying via the web browser a locked screen display for the designated applications, wherein the locked screen display provides instructions to enter a password or other credential for access to the designated applications, while the web browser remains available to provide access to other, non-designated applications.

2. The method according to claim 1, wherein:
the storing the authorization credentials associated with the user comprises storing the authorization credentials in a lock box, wherein the lock box can be formed as at least a portion of cache memory contained on the client system.

3. The method according to claim 1, wherein:
the receiving a message at the web browser comprises receiving a message to lock one or more of a particular application running on the web browser, applications running within a particular tab on the web browser, or applications running with the web browser.

4. The method according to claim 1, wherein:
the locked screen display provides instructions to enter a password or other credential for access to the designated applications wherein the password or other credential is the same password or other credential as needed to unlock one or more of the designated applications.

5. The method according to claim 1, wherein:
the instructions received at the web browser to lock the designated applications are user-originated.

6. The method according to claim 5, wherein:
the instructions comprise, at least in part, entry by the user of a selection from a toolbar included in the web browser.

7. The method according to claim 5, wherein:
the instructions comprise, at least in part, entry by the user of a selection from a menu within the web browser.

8. The method according to claim 5, wherein:
the instructions comprise, at least in part, entry by the user of one or more activations of an input device.

9. The method according to claim 8, wherein:
the one or more activations of an input device comprise one or more keyboard shortcuts.

10. The method according to claim 1, wherein:
the instructions received at the web browser to lock the designated applications comprise a time-based trigger.

11. The method according to claim 1, wherein:
the instructions to lock the designated applications comprise one or more of time-based instructions or user-initiated instructions.

12. The method according to claim 1, further comprising:
the receiving a message at the web browser indicating instructions to lock the designated applications further comprises:

evaluating one or more of state or states of the designated applications, one or more actions of the user within the designated applications, a time elapsed since the user has taken an action within the designated applications, or a physical location of the user relative to a location of the client system running the web browser; and based on the results of the evaluation, sending instructions to a locked display utility operatively configured to obscure or at least partially blank-out the visual displays for the designated applications.

13. A system for securing data associated with designated applications opened in a web browser on a client system, the system comprising:

one or more hardware processors; and a machine-readable medium comprising instructions stored therein, which when executed by the processors, cause the processors to perform operations comprising:

receiving identification of the designated applications opened in the web browser and for which a user desires to secure data within the designated applications from being accessed or processed by unauthorized users;

identifying authorization keys for each of the designated applications;

receiving and storing the identified authorization keys for each of the designated applications;

instantiating locking of each of the designated applications upon receiving instructions to secure data associated with the designated applications; and displaying via the web browser a locked screen display for the designated applications, wherein the locked screen display provides instructions to enter a password or other credential for access to the designated applications, while the web browser remains available to provide access to other, non-designated applications.

14. The system of claim 13, wherein the processors are further caused to perform operations comprising:
receiving identification of the designated applications opened in the web browser from user initiated actions comprising one or more of selection by the user from a toolbar in the web browser, selection by the user from a menu in the web browser, or entry by the user of one or more activations of an input device.

15. The system of claim 13, wherein the processors are further caused to perform operations comprising:
receiving instructions to secure data associated with the designated applications, wherein the instructions comprise one or more of time-based instructions or user-initiated instructions.

16. The system of claim 13, wherein the processors are further caused to perform operatons comprising:
evaluating one or more of state or states of the designated applications, one or more actions of the user within the designated applications, a time elapsed since the user has taken an action within the designated applications, or a physical location of the user relative to a location of the client system running the web browser; and based on the results of the evaluation, sending instructions to the locked display utility to obscure or at least partially blank-out the visual displays for the locked designated applications.

17. The system of claim 16, further comprising wherein the processors are further caused to perform operations comprising:
discontinuing use of at least one resources of the client system by the locked designated applications after a pre-determined time period following the sending of instructions to the locked display utility to obscure or at least partially blank-out the visual displays for the locked designated applications.

18. One or more non-transitory computer-readable media storing processor-executable instructions that, when executed, cause one or more processors to perform operations that enable securing data associated with designated applications opened in a web browser on a client system, the operations comprising:

executing a web browser on the client system;

receiving via the web browser running on the client system an access request from a user to access one or more applications available from a hosting server over a network in communication with the client system;

communicating from the client system to the hosting server the request for access to the one or more applications;

receiving via the web browser, authorization credentials associated with the user for accessing one or more designated applications of the one or more applications available from the hosting server;

storing the authorization credentials in a lockbox on the web browser;

receiving a message via the web browser indicating instructions to lock the designated applications; and locking, in response to the message, the designated applications by rendering one or more at least partially blanked-out or partially obscured visual displays by the web browser for the designated applications with no viewing of, access to, or operation on selected data within the designated applications permitted, while the locked designated applications remain logged-in; and displaying via the web browser a locked screen display for the designated applications, wherein the locked screen display provides instructions to enter a password or other credential for access to the designated applications, while the web browser remains available to provide access to other, non-designated applications.

19. The one or more non-transitory computer readable media as recited in claim 18, the operations further comprising:

displaying by the web browser a locked screen display for the designated applications, wherein the locked screen display provides instructions to enter a password or other credentials for access to the designated applications, while the web browser remains available to provide access to other, non-designated applications.

20. The one or more non-transitory computer readable media as recited in claim 18, the operations further comprising:

the instructions to lock the designated applications comprise one or more of time-based instructions or user-initiated instructions.

21. The one or more non-transitory computer readable media as recited in claim 18, the operations further comprising:

the receiving a message at the web browser indicating instructions to lock the designated applications further comprises:

evaluating one or more of state or states of the designated applications, one or more actions of the user within the designated applications, a time elapsed since the user has taken an action within the designated applications, or a physical location of the user relative to a location of the client system running the web browser; and based on the results of the evaluation, sending instructions to a locked display utility operatively configured to obscure or at least partially blank-out the visual displays for the designated applications.

22. The one or more non-transitory computer readable media as recited in claim 18, the operations further comprising:

the receiving a message at the web browser indicating instructions to lock the designated applications further comprises discontinuing use of at least one resources of the client system by the locked designated applications after a pre-determined time period following the sending of instructions to the locked display utility to obscure or at least partially blank-out the visual displays for the locked designated applications.

* * * * *